(12) United States Patent
Hamasaki et al.

(10) Patent No.: US 7,711,237 B2
(45) Date of Patent: May 4, 2010

(54) OPTICAL TRANSMISSION LINE HOLDING MEMBER, OPTICAL MODULE AND MOUNTING METHOD THEREOF

(75) Inventors: Hiroshi Hamasaki, Hiratsuka (JP); Hideto Furuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/252,702

(22) Filed: Oct. 16, 2008

(65) Prior Publication Data
US 2009/0103864 A1    Apr. 23, 2009

(30) Foreign Application Priority Data
Oct. 19, 2007    (JP) ............................. 2007-272984

(51) Int. Cl.
  *G02B 6/00*    (2006.01)
(52) U.S. Cl. ...................................... 385/137; 385/141
(58) Field of Classification Search .................... 385/15, 385/31, 88, 90, 135, 137, 141
See application file for complete search history.

(56) References Cited

U.S. PATENT DOCUMENTS

| | | | |
|---|---|---|---|
| 6,181,854 B1* | 1/2001 | Kojima et al. .................. | 385/49 |
| 7,198,412 B2 | 4/2007 | Hamasaki et al. | |
| 7,300,213 B2 | 11/2007 | Hamasaki et al. | |
| 7,364,369 B2 | 4/2008 | Sakurai et al. | |
| 7,401,983 B2 | 7/2008 | Sakurai et al. | |
| 2001/0026665 A1* | 10/2001 | Ando et al. .................... | 385/94 |
| 2002/0051607 A1* | 5/2002 | Ido et al. ....................... | 385/49 |
| 2005/0232549 A1* | 10/2005 | Takahashi et al. ............. | 385/55 |
| 2007/0081769 A1 | 4/2007 | Hamasaki et al. | |
| 2008/0088929 A1* | 4/2008 | Morioka et al. ............... | 359/566 |
| 2008/0226238 A1* | 9/2008 | Sumi et al. .................... | 385/88 |

FOREIGN PATENT DOCUMENTS

JP    2001-159724    6/2001

OTHER PUBLICATIONS

U.S. Appl. No. 12/130,585, filed May 30, 2008, Hiroshi Hamasaki, et al.

Hiroshi Hamasaki, et al., "Novel Optoelectronic LSI Packaging Suitable for Standard FR-4 Printed Wiring Board with Bandwidth Capability of Over 1Tbps", Proceedings of the 56th Electronic Components and Technology Conference, 2006, pp. 298-302.

Wataru Sakurai, "A Novel Optoelectronic Ferrule and Easy Ribbon Fiber Splicer for Cost-effective Optical Interconnection", Proceedings of the 8th Electronics Packaging Technology Conference, 2006, pp. 367-372.

* cited by examiner

*Primary Examiner*—Akm E Ullah
(74) *Attorney, Agent, or Firm*—Oblon, Spivak, McClelland, Maier & Neustadt, L.L.P.

(57) ABSTRACT

An optical transmission line holding member includes a main body that mechanically positions and holds an optical transmission line, and an electrical interconnection used to mount an optical element. The main body includes a holding hole which opens in one surface of the main body and is used to mechanically position and hold the optical transmission line, an guide hole which opens in another surface of the main body, has a diameter larger than that of the holding hole and is coaxially aligned with the holding hole, and a resin storage groove provided in the guide hole. The electrical interconnection is formed on the surface in which the holding hole opens.

19 Claims, 4 Drawing Sheets

OPTICAL TRANSMISSION LINE HOLDING MEMBER, OPTICAL MODULE AND MOUNTING METHOD THEREOF

CROSS-REFERENCE TO RELATED APPLICATIONS

This application is based upon and claims the benefit of priority from prior Japanese Patent Application No. 2007-272984, filed Oct. 19, 2007, the entire contents of which are incorporated herein by reference.

BACKGROUND OF THE INVENTION

Recently, the technique for reducing mounting costs is studied and developed by use of a coupling system called a direct optical coupling (butt joint) system. In the coupling system, an optical fiber and optical semiconductor element are arranged in close positions to face each other and optically coupled without using a lens. When the direct optical coupling system is used, it is important to arrange an optical semiconductor element and optical fiber in close positions and prevent light from reaching an unwanted portion. Therefore, there is proposed a method for directly forming an electrical interconnection on the main surface of an optical transmission line holding member (a so-called optical fiber ferrule) that holds the optical fiber and the like and mounting an optical semiconductor element on the main surface to set the light receiving/transmitting region thereof in opposition to the optical fiber (Jpn. Pat. Appln. KOKAI Publication No. 2001-159724).

In this type of method, it is desired to fill resin in between the optical semiconductor element and the optical transmission line so as to suppress reflection light caused by discontinuity of the refractive index. Specifically, resin having a role as a refractive index matching material and an under-filling function for protection of the electrical connecting portion of the optical element is filled in between the optical semiconductor element and the end face of the optical transmission line. Further, resin used to mechanically fix the optical transmission line on a ferrule is filled.

As a method for forming the above resins, a method for performing an under-filling process before fixing the optical transmission line and a method for fixing the optical transmission line and then performing an under-filling process are considered. When the optical transmission line is first fixed, there occurs a possibility that fixing resin flows into holding holes for the optical transmission line to reach the end face on the optical element side. Further, since the fixing resin fills in the holding holes, the holes via which air escapes when under-fill resin is injected are closed or blocked. This means that the holes via which a solvent produced at the curing time of the under-fill resin is extracted are closed. Therefore, there occurs a possibility that bubbles remain in the resin at the curing time of the under-fill resin and this may prevent the optical coupling. When the under-filling process is first performed, there occurs a problem that high mechanical precision cannot be attained.

BRIEF SUMMARY OF THE INVENTION

According to one aspect of the present invention, there is provided an optical transmission line holding member which includes a main body which mechanically positions and holds an optical transmission line, the main body including a holding hole which opens in one surface and is used to mechanically position and hold the optical transmission line, a guide hole which opens in another surface different from the one surface, has a diameter larger than that of the holding hole and is coaxially aligned with the holding hole to guide the optical transmission line into the holding hole, and a resin storage groove provided in the guide hole, and an electrical interconnection used to mount an optical element to be optically coupled with the optical transmission line, the electrical interconnection being formed on the surface in which the holding hole opens.

According to another aspect of the present invention, there is provided an optical module which includes an optical transmission line, a main body which mechanically positions and holds the optical transmission line, the main body including a holding hole which opens in one surface and is used to mechanically position and hold the optical transmission line, a guide hole which opens in another surface different from the one surface, has a diameter larger than that of the holding hole and is coaxially aligned with the holding hole to guide the optical transmission line into the holding hole, and a resin storage groove provided in the guide hole, an electrical interconnection formed on the surface in which the holding hole of the main body opens, an optical element mounted on the surface in which the holding hole opens, the optical element being optically coupled with the optical transmission line electrically connected to the electrical interconnection and positioned and fixed in the holding hole, and resin filled in between the optical element and the optical transmission line and in the guide hole.

According to still another aspect of the present invention, there is provided an optical module mounting method which includes preparing an optical transmission line holding member which includes a main body which mechanically positions and holds an optical transmission line and an electrical interconnection used to mount an optical element, the main body including a holding hole which opens in one surface and is used to mechanically position and hold the optical transmission line, a guide hole which opens in another surface different from the one surface, has a diameter larger than that of the holding hole and is coaxially aligned with the holding hole, and a resin storage groove provided in the guide hole, and the electrical interconnection being formed on the surface in which the holding hole opens, mounting an optical element on the surface in which the holding hole of the main body opens and electrically connecting the optical element to the electrical interconnection, temporarily fixing the optical transmission line on the optical transmission line holding member by filling first resin into part of a faraway portion of the guide hole far apart from the holding hole with respect to the resin storage groove after inserting the optical transmission line to a preset position of the holding hole through the guide hole, filling second resin as a refractive index matching material in between the optical element mounted and the optical transmission line temporarily fixed, and fixing the optical transmission line on the optical transmission line holding member by filling third resin into the guide hole after filling the second resin.

DETAILED DESCRIPTION OF THE INVENTION

Embodiments of the present invention will be explained in detail with reference to the accompanying drawings.

First Embodiment

Figure 1:
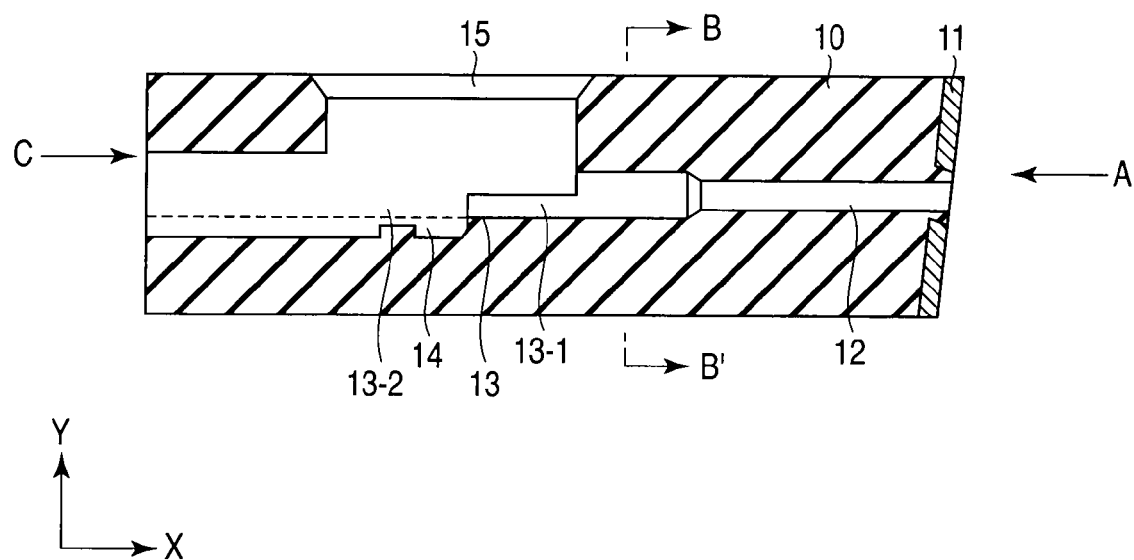
FIG. 1 is a cross-sectional view showing an example of the schematic structure of an optical transmission line holding member according to a first embodiment of this invention.
Figure 2A:
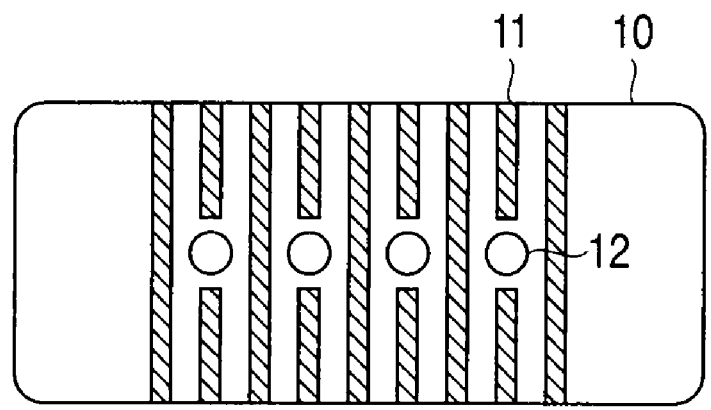
FIGS. 2A to 2C are side views and cross-sectional view showing portions of the optical transmission line holding member of the first embodiment.
Figure 2B:
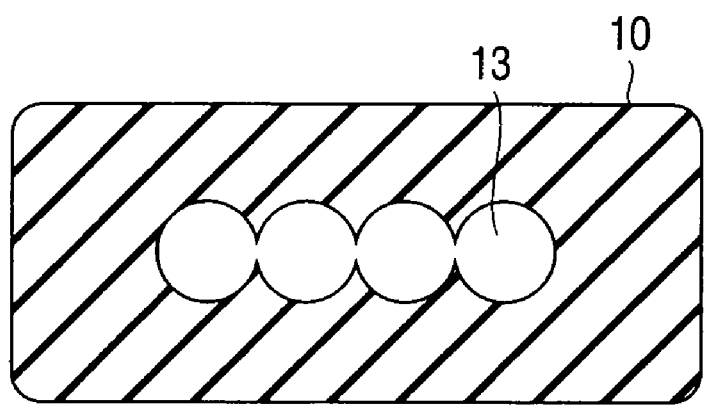
Figure 2C:
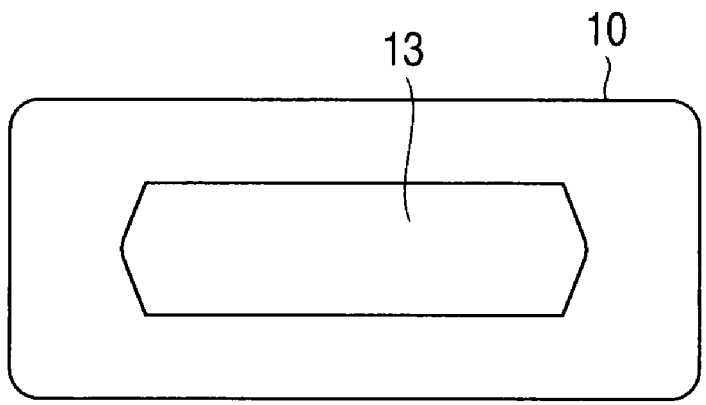

FIG. 1 is a cross-sectional view showing an example of the schematic structure of an optical transmission line holding member according to a first embodiment of this invention. Further, FIG. 2A is a side view (right-side view) as viewed in an A direction of FIG. 1, FIG. 2B is a cross-sectional view taken along line B-B' of FIG. 1 and FIG. 2C is a side view (left-side view) as viewed in a C direction of FIG. 1.

In FIG. 1, a symbol 10 denotes an optical transmission line holding portion (holding member main body) used to hold an optical transmission line such as an optical fiber. The optical transmission line holding portion 10 is formed of a material obtained by mixing a filler such as silicon oxide or alumina into resin such as epoxy resin or PPS. On one side (optical element mounting surface) of the optical transmission line holding portion 10, an electrical interconnection 11 for mounting an optical element is formed. As shown in FIG. 1, the electrical interconnection 11 can be realized by a structure that is formed by embedding a lead frame formed of Cu or Cu alloy into the optical element mounting surface portion and exposing the end face of the lead frame to the side surfaces (in FIG. 1, upper and lower surfaces) of the optical transmission line holding portion 10. In this case, the end face of the lead frame can be used as an external connection electrode pad. Therefore, a simulated orthogonal interconnection can be formed to extend from the optical element mounting surface to another side surface without performing a special 3-dimensional process. As a result, the optical transmission line holding member can be easily mounted on the surface parallel to the optical transmission line.

In the optical transmission line holding portion 10, holding holes 12 used to precisely position and hold the optical transmission line such as an optical fiber are formed. The holding holes 12 open in the surface on which the electrical interconnection 11 is formed and are arranged in a straight line as shown in FIG. 2A. The holding hole 12 may be formed singly or a plurality of holding holes may be formed, but in this example, a plurality of holding holes are formed.

Further, in the optical transmission line holding portion 10, optical transmission line guide holes 13 used to guide the optical transmission line into the holding hole 12 are formed. The guide hole 13 is coaxially aligned with the holding hole 12 and opens in the surface opposite to the holding hole 12. As shown in FIG. 2B, the optical transmission line guide hole 13 has a larger diameter than the holding hole 12. Further, the connecting portion of the guide hole 13 with the holding hole 12 is formed in a tapered form so that the optical transmission line can be easily inserted and guided into the holding hole 12. A resin storage groove portion 14 having a larger diameter is formed in an intermediate portion of the guide hole 13. The guide hole 13 is divided into a portion 13-1 lying near the holding hole 12 and a portion 13-2 lying far apart from the holding hole 12 with respect to the resin storage groove portion 14. The resin storage groove portion 14 may be formed of an annular groove coaxially formed with the optical transmission line guide hole 13 or may be formed by digging the optical transmission line holding portion 10 on the bottom side of the optical transmission line guide hole 13.

In the optical transmission line holding portion 10, a resin window 15 used to flow optical transmission line fixing resin is provided. The resin window 15 is connected to the optical transmission line guide hole 13 containing the resin storage groove portion 14. By forming the structure having the resin window 15, a groove having an opening with a large diameter can be formed by injection molding by use of a die. If the resin window 15 is not formed, for example, since it becomes necessary to coaxially form a groove having a large opening, the structure in which the die cannot be extracted is formed. Therefore, the structure may be formed by cutting or assembling divided parts and the manufacturing cost will be high.

In the structure of FIG. 1, the diameter is made larger on the optical transmission line insertion side on the rear side of the optical transmission line guide hole 13 (on the side opposite to the optical element) and, as shown in FIG. 2C, adjacent ones of the guide holes 13 are connected to form one hole. By thus forming the guide holes 13 into one hole, the structure in which a coating of the optical transmission line can be held in the optical transmission line holding member can be attained. Thus, the effect that breakage due to bending of an optical fiber used as an optical transmission line can be alleviated can be attained.

FIGS. 3A to 3D are cross-sectional views for illustrating an optical module mounting process using the optical transmission line holding member shown in FIG. 1 and FIGS. 2A to 2C.

Figure 3A:
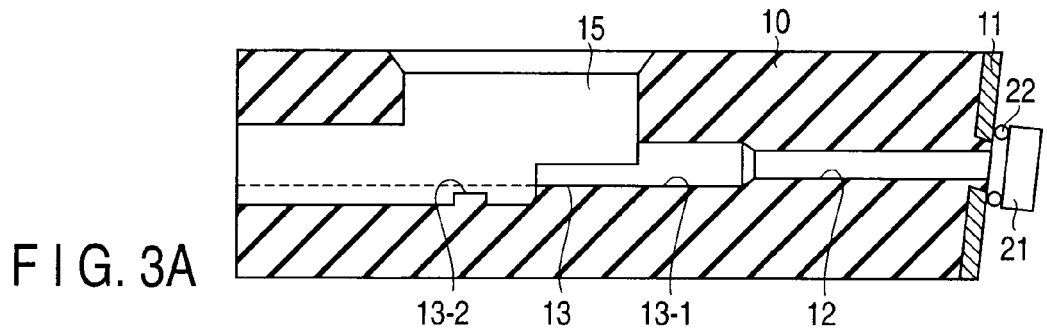
FIGS. 3A to 3D are cross-sectional views for illustrating an optical module mounting process using the optical transmission line holding member of the first embodiment.

As in FIG. 3A, an optical semiconductor element 21 such as a light emitting element or light receiving element is electrically connected to the electrical interconnection 11 formed on the right-side surface of the optical transmission line holding portion 10 via bumps 22. For this connection, a method such as an ultrasonic flip chip mounting method may be used. The bumps 22 for connection are formed of stud Au bumps or solder bumps, for example.

Figure 3B:
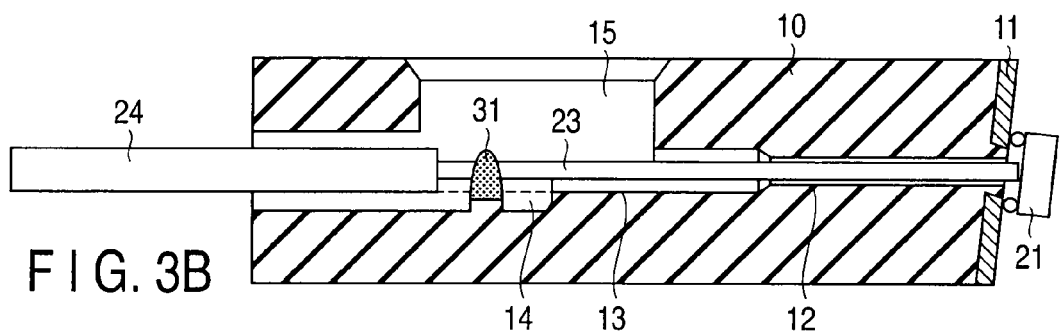

As shown in FIG. 3B, an optical transmission line 23 such as an optical fiber is inserted through the opening on the left side of the optical transmission line holding member 10 and further inserted into the holding hole 12 via the optical transmission line guide hole 13. At this time, the length of part of the optical transmission line 23 which is exposed by removing a coating portion 24 is previously determined so that part of the coating portion 24 of the optical transmission line 23 will be inserted into the optical transmission line guide hole 13.

When the front end of the optical transmission line 23 reaches a preset position close to the optical semiconductor element 21, a temporary-fixing bonding agent (first resin) 31 is coated on part of the optical transmission line guide hole 13 and the optical transmission line 23 is temporarily fixed in the guide hole 13 by curing the bonding agent 31. At this time, the bonding agent 31 is filled on the opposite side of the holding hole 12 with respect to the resin storage groove portion 14. That is, the bonding agent 31 is filled on the portion 13-2 of the optical transmission line guide hole 13 that lies far apart from the holding hole 12 with respect to the resin storage groove portion 14. When the optical transmission line 23 is an optical fiber, the end face position of the optical transmission line 23 can be prevented from being shifted due to expansion or contraction of the coating portion 24 by fixing the optical transmission line with the coating portion 24 removed as shown in FIG. 3B. Further, even if the bonding agent 31 tends to flow towards the holding hole 12, the bonding agent 31 stays in the groove portion 14 due to the presence of the resin storage groove portion 14. Therefore, the bonding agent 31 does not fill in the holding hole 12.

Figure 3C:
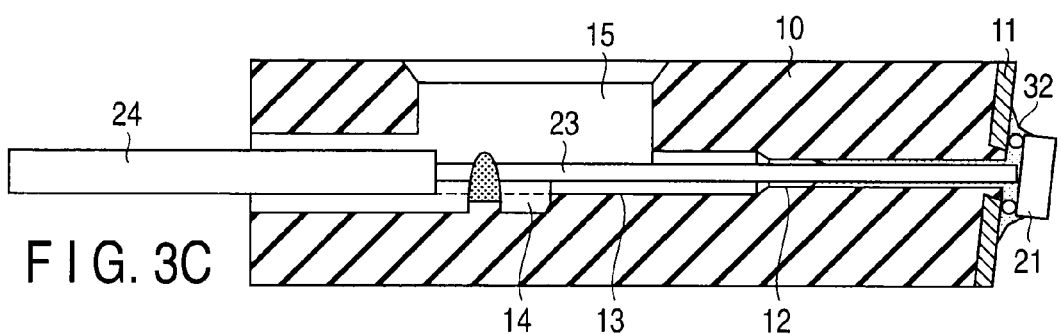

As shown in FIG. 3C, under-fill resin (second resin) 32 is injected to fill in between the optical semiconductor element 21 and the optical transmission line 23 and surround the bumps 22 corresponding to electrical connecting portions between the optical semiconductor element 21 and the electrical interconnection 11 and is then cured. At this time, since the holding hole 12 is not filled with the bonding agent 31, the under-fill resin 32 is rapidly filled into the holding hole 12 without producing bubbles.

Figure 3D:
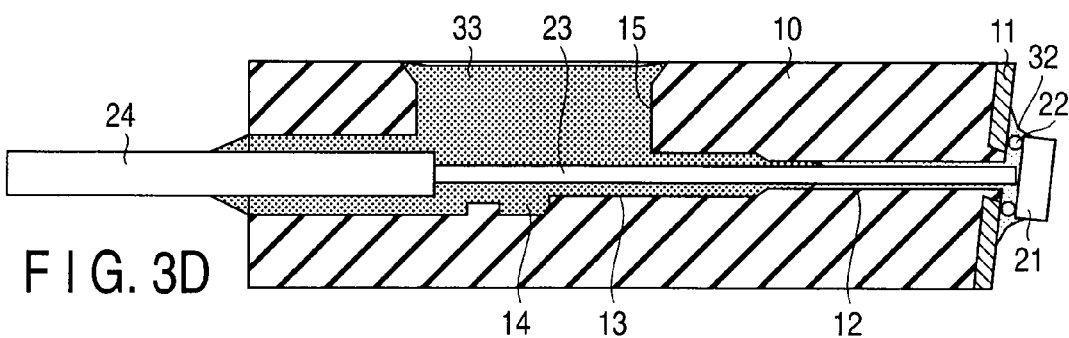

As shown in FIG. 3D, resin (third resin) 33 is fully filled through the resin window 15. Thus, the coating portion 24 is fixed in the guide hole 13 of the optical transmission line holding portion 10 and the optical transmission line 23 is fixed in the holding hole 12 and guide hole 13. In this case, since the holding hole 12 is filled with the under-fill resin 32, there occurs a possibility that bubbles will be produced when the resin 33 is filled into the holding hole 12. However, since the resin 33 is used to hold and fix the optical transmission line 23, there occurs no problem even when bubbles are produced.

In the step of FIG. 3B, when the temporary-fixing bonding agent 31 flows into the holding hole 12 through the guide hole 13 and is filled into the holding hole 12, a lowering in the light output of the optical module and an increase in variations may occur. That is, if the temporary-fixing bonding agent 31 is filled in the holding hole 12, air is sealed in a space surrounded by the optical semiconductor element 21, optical transmission line 23 and holding hole 12 when the under-fill agent 32 is injected. If the under-fill agent 32 is cured in this state, air remains in the resin 32 as bubbles. If the bubbles are present between the optical semiconductor element 21 and the end face of the optical transmission line 23, the degree of optical coupling will be lowered. As a result, a lowering in the light output of the optical module and an increase in variations may occur.

Therefore, in the present embodiment, in order to prevent the temporary-fixing bonding agent 31 from flowing into the holding hole 12 through the guide hole 13, the resin storage groove portion 14 is provided and the temporary-fixing bonding agent 31 is coated on the portion 13-2 far apart from the holding hole 12. As a result, even if the temporary-fixing bonding agent 31 flows into the holding hole 12, the bonding agent 31 can be stored in the groove portion 14. Therefore, the bonding agent 31 does not reach the holding hole 12 and is not filled into the holding hole 12. As a result, it becomes possible to prevent bubbles from occurring even when the under-fill resin 32 is coated later.

In the case of FIG. 1, the guide hole 13 is divided into the portion 13-1 near the holding hole 12 and the portion 13-2 far apart therefrom and the diameter of the nearby portion 13-1 is set smaller than that of the faraway portion 13-2. That is, in FIG. 1, the height of the faraway portion 13-2 in a y direction is set lower than that of the nearby portion 13-1. Thus, the viewing angle of the optical transmission line that permits the optical transmission line to be inserted into the portion 13-1 of the guide hole 13 lying near the holding hole 12 is not narrowed by the presence of the faraway portion 13-2. Therefore, the effect that the optical transmission line can be mounted without causing the faraway portion 13-2 to act as an obstacle at the time of insertion of the optical transmission line can be attained.

As described above, according to the present embodiment, the optical semiconductor element 21 and optical transmission line 23 can be directly and optically coupled at a low cost by providing the holding hole 12 used to mechanically position and hold the optical transmission line 23, the optical transmission line guide hole 13 having a diameter larger than the holding hole 12 and the resin storage groove portion 14 in the optical transmission line holding portion 10. Further, the under-fill resin 32 can be filled into between the optical semiconductor element 21 and the optical transmission line 23 without fail with the optical transmission line 23 temporarily fixed by use of the bonding agent 31. Therefore, production of bubbles between the optical semiconductor element 21 and the optical transmission line 23 can be suppressed and the high mechanical precision can be attained while maintaining the high optical characteristic.

Further, the optical semiconductor element 21 can be assembled while an optical fiber used as the optical transmission line 23 is set as a reference. Therefore, the optical transmission line can be mounted with high precision in the lateral direction by use of a normal flip chip method and the structure in which the number of parts used can be reduced and the cost can be lowered can be attained. Further, the part manufacturing cost can be greatly reduced by using resin to form the base member of the optical transmission line holding portion 10. Also, the orthogonal transformation can be attained by forming the electrical interconnection 11 from the surface in which the holding hole 12 opens to the side surface. As a result, an advantage that the optical transmission line 23 can be prevented from rising at right angles with respect to the mounting surface while the direction in which the optical transmission line 23 extends is kept set parallel to the mounting surface can be attained.

Second Embodiment

Figure 4:
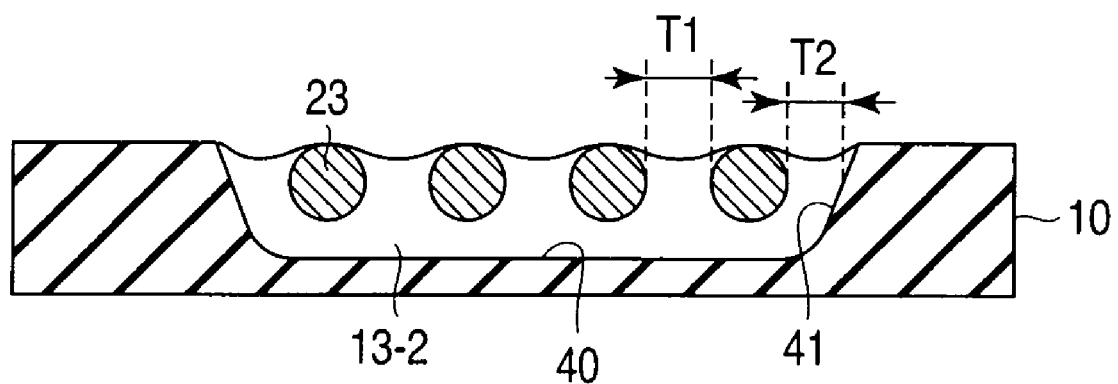
FIG. 4 is a cross-sectional view showing the structure of the main portion of an optical transmission line holding member according to a second embodiment of this invention.

FIG. 4 is a cross-sectional view showing the structure of the main portion of an optical transmission line holding member according to a second embodiment of this invention. Particularly, FIG. 4 shows a cross section when viewing a faraway portion 13-2 of a guide hole 13 in an axial direction of optical transmission lines 23. In FIG. 4, portions that are the same as those of FIG. 1 are denoted by the same reference symbols and the detailed description thereof is omitted.

The adjacent faraway guide holes 13-2 of the optical transmission line guide holes 13 that lie far apart from holding holes 12 are connected together to form one hole. The hole has a bottom surface 40 and side surfaces 41 and is formed in a form to surround the optical transmission lines 23 in three directions. In this example, the optical transmission lines 23 are arranged at an equal interval T1 and the sizes of the guide holes 13-2 are so set that the distance T2 between one of the optical transmission lines 23 which lies on the outermost side and the side surface 41 of the guide hole 13-2 will be set substantially equal to T1.

With the above structure, the tensile stress in the lateral direction applied to the optical transmission lines 23 by resin contracted at the curing time after temporary-fixing resin 31 is coated can be made uniform with respect to the optical transmission lines 23 due to the effect of the presence of the sidewall 41. That is, if a case wherein the sidewall 41 is not provided is considered as an extreme case, only stress caused by the resin between the optical transmission line 23 on the outermost side and the adjacent optical transmission line is applied to the above optical transmission line and the stress distribution becomes asymmetrical on both sides of the above optical transmission line. Therefore, there occurs a problem that asymmetrical residual stress is applied to the optical transmission line 23 and the possibility of breakage is raised. However, since the sidewall 41 is provided to set T1=T2 in this embodiment, the tensile stress can be made uniform and occurrence of residual stress can be suppressed.

This embodiment may be advantageous in the following point in comparison with the case wherein the sidewall 41 is not provided. That is, when the temporary-fixing resin 31 is coated as shown in FIG. 3B, an overflowing bonding agent flows into a resin storage groove portion 14. At this time, the resin tends to flow along the sides of the groove portion 14 that are tangential lines of two walls due to the effect of surface tension. The bonding agent that reaches the bottom surface of the groove portion 14 tends to flow along the side of the bottom surface, spread on the bottom surface and flow in a direction towards the guide hole 13-1 along the side that vertically rises from the bottom surface of the groove portion 14 to the guide hole 13-1. Therefore, in order to prevent the bonding agent from flowing into the guide hole 13-1, it is effective to make the side that vertically rises from the bottom surface of the groove portion 14 to the guide hole 13-1 as high (long) as possible and it is effective to provide the sidewalls 41 as shown in FIG. 4.

(Modification)

This invention is not limited to the above embodiments. For example, the number of resin storage groove portions is not limited to one and a plurality of resin storage groove portions can be provided. In this case, the probability that the resin will flow into the holding holes can be further lowered. In the above embodiments, the cross-sectional surface of the electrical lead is set to be flush with the side surface adjacent to the optical element mounting surface, but the electrical lead may be made to project from the side surface to the exterior. Further, in the above embodiments, the optical fiber is used as the optical transmission line, but a light waveguide can be used. The material used as the base member of the optical transmission line holding member and the material of the electrical interconnection can be adequately changed according to a specification.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical transmission line holding member comprising:
a main body which mechanically positions and holds an optical transmission line, the main body including a holding hole which opens in one surface and is used to mechanically position and hold the optical transmission line, a guide hole which opens in another surface different from the one surface, has a diameter larger than that of the holding hole and is coaxially aligned with the holding hole to guide the optical transmission line into the holding hole, and a resin storage groove provided in the guide hole; and
an electrical interconnection used to mount an optical element to be optically coupled with the optical transmission line, the electrical interconnection being formed on the surface in which the holding hole opens.

2. The optical transmission line holding member of claim 1, wherein the guide hole has a diameter on a side far apart from the holding hole with respect to the resin storage groove larger than a diameter on a side nearer thereto.

3. The optical transmission line holding member of claim 1, wherein the holding hole has a plurality of holding holes, the guide holes are connected together at portions far apart from the holding holes with respect to the resin storage groove to form one hole and a distance between an exterior side of arrangement of a plurality of optical transmission lines introduced into the guide holes and held in the holding holes and a sidewall of the one guide hole is set substantially equal to a distance between adjacent ones of the optical transmission lines.

4. The optical transmission line holding member of claim 1, wherein the optical transmission line is an optical fiber coated with a coating member on an external surface thereof, the diameter of the holding hole is slightly larger than a diameter of a front end portion of the optical fiber from which the coating member is removed and the diameter of the guide hole is larger than a diameter of a portion of the optical fiber which has the coating member.

5. The optical transmission line holding member of claim 1, wherein the main body has a resin window formed to flow resin used for fixing the optical transmission line in the guide hole, resin storage and the groove is provided direct below the resin window.

6. The optical transmission line holding member according to claim 1, wherein a connecting portion between the holding hole and the guide hole is formed in a tapered form.

7. An optical module comprising:
an optical transmission line;
a main body which mechanically positions and holds the optical transmission line, the main body including a holding hole which opens in one surface and is used to mechanically position and hold the optical transmission line, a guide hole which opens in another surface different from the one surface, has a diameter larger than that of the holding hole and is coaxially aligned with the holding hole to guide the optical transmission line into the holding hole, and a resin storage groove provided in the guide hole;
an electrical interconnection formed on the surface in which the holding hole of the main body opens;
an optical element mounted on the surface in which the holding hole opens, the optical element being optically coupled with the optical transmission line electrically connected to the electrical interconnection and positioned and fixed in the holding hole; and
resin filled in between the optical element and the optical transmission line and in the guide hole.

8. The optical module of claim 7, wherein the guide hole has a diameter on a side far apart from the holding hole with respect to the resin storage groove larger than a diameter on a side nearer thereto.

9. The optical module of claim 7, wherein the holding hole has a plurality of holding holes, the guide holes are connected together at portions far apart from the holding holes with respect to the resin storage groove to form one guide hole and a distance between an exterior side of arrangement of a plurality of optical transmission lines introduced into the guide holes and held in the holding holes and a sidewall of the one guide hole is set substantially equal to a distance between adjacent ones of the optical transmission lines.

10. The optical module of claim 7, wherein the optical transmission line is an optical fiber coated with a coating member on an external surface thereof, the diameter of the holding hole is slightly larger than a diameter of a front end portion of the optical fiber from which the coating member is removed and the diameter of the guide hole is larger than a diameter of a portion of the optical fiber which has the coating member.

11. The optical module of claim 7, wherein the main body has a resin window formed to flow resin used for fixing the optical transmission line in an intermediate portion of the guide hole.

12. The optical module of claim 7, wherein a connecting portion between the holding hole and the guide hole is formed in a tapered form.

13. The optical module of claim 7, wherein the resin includes first resin used to temporarily fix part of the optical transmission line in the guide hole, second resin used as a refractive index matching material to fill in between the optical semiconductor element and an end face of the optical transmission line and third resin filled in the guide hole to fix the optical transmission line therein.

14. An optical module mounting method comprising:
preparing an optical transmission line holding member which includes a main body which mechanically positions and holds an optical transmission line and an electrical interconnection used to mount an optical element, the main body including a holding hole which opens in one surface and is used to mechanically position and hold the optical transmission line, an guide hole which opens in another surface different from the one surface, has a diameter larger than that of the holding hole and is coaxially aligned with the holding hole, and a resin storage groove provided in the guide hole, and the electrical interconnection being formed on the surface in which the holding hole opens;
mounting an optical element on the surface in which the holding hole of the main body opens and electrically connecting the optical element to the electrical interconnection;
temporarily fixing the optical transmission line on the optical transmission line holding member by filling first resin into part of a faraway portion of the guide hole far apart from the holding hole with respect to the resin storage groove after inserting the optical transmission line to a preset position of the holding hole through the guide hole;
filling second resin as a refractive index matching material in between the optical element mounted and the optical transmission line temporarily fixed; and
fixing the optical transmission line on the optical transmission line holding member by filling third resin into the guide hole after filling the second resin.

15. The optical module mounting method of claim 14, wherein the guide hole has a diameter on a side far apart from the holding hole with respect to the resin storage groove larger than a diameter on a side nearer thereto.

16. The optical module mounting method of claim 14, wherein the holding hole has a plurality of holding holes, the guide holes are connected together at portions far apart from the holding holes with respect to the resin storage groove to form one hole and a distance between an exterior side of arrangement of a plurality of optical transmission lines introduced into the guide holes and held in the holding holes and a sidewall of the one guide hole is set substantially equal to a distance between adjacent ones of the optical transmission lines.

17. The optical module mounting method of claim 14, wherein the optical transmission line is an optical fiber coated with a coating member on an external surface thereof, the diameter of the holding hole is slightly larger than a diameter of a front end portion of the optical fiber from which the coating member is removed and the diameter of the guide hole is larger than a diameter of a portion of the optical fiber which has the coating member.

18. The optical module mounting method of claim 14, wherein the main body has a resin window formed to flow resin used for fixing the optical transmission line in an intermediate portion of the guide hole and the first and third resins are injected through the resin window.

19. The optical module mounting method of claim 14, wherein a connecting portion between the holding hole and the guide hole is formed in a tapered form.

* * * * *